July 21, 1936. W. I. JONES 2,048,659

FASTENER SECURED INSTALLATION

Filed Jan. 16, 1934

Inventor:
Walter I. Jones

Patented July 21, 1936

2,048,659

UNITED STATES PATENT OFFICE 2,048,659

FASTENER SECURED INSTALLATION

Walter I. Jones, Arlington, Mass., assignor to United-Carr Fastener Corporation, Cambridge, Mass., a corporation of Massachusetts Application January 16, 1934, Serial No. 706,848

9 Claims. (Cl. 45—138)

My invention aims to provide improvements in snap fastener installations particularly, though not exclusively, useful in connection with upholstery structures.

In the drawing which illustrates a preferred embodiment of my invention:—

Figure 1:
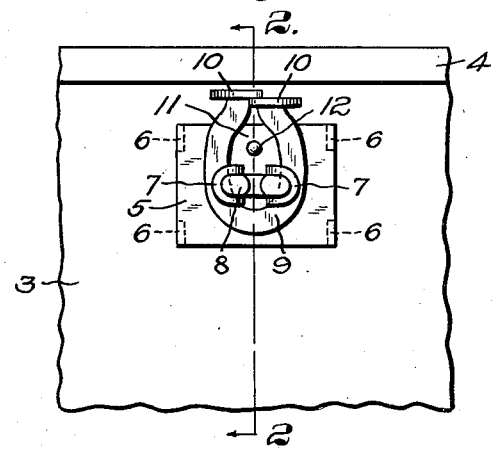
Figure 1 is an elevational view of a portion of the inner face of an upholstery panel showing my improved fastener structure in position.

Referring to the particular embodiment of my invention illustrated by the drawing, I have shown an improved fastener structure for use primarily in connection with securing upholstery panels to framework. The panel structure and the frame structure may be of the usual now well-known construction, but the entire combination of elements is, I believe, new and in many instances more desirable than the structures now being used.

Figure 2:
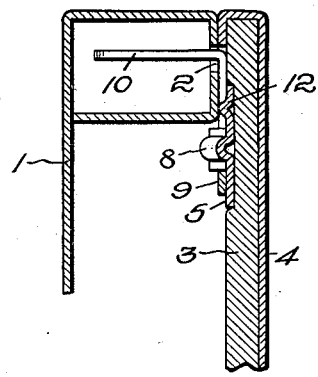
Fig. 2 is a section taken on the line 2—2 of Figure 1 and also includes a portion of the supporting structure for the panel.

The specific structure illustrated includes a metallic frame member 1 provided with one or more stud-receiving apertures 2, as illustrated in Fig. 2. The upholstery panel includes the usual cardboard and like backing 3 covered on one side by a flexible material such as fabric 4. The covering material 4 is wrapped over the edge and extends over the back of the backing 3 and if desirable may be adhesively secured throughout its contact with the cardboard backing.

Figure 4:
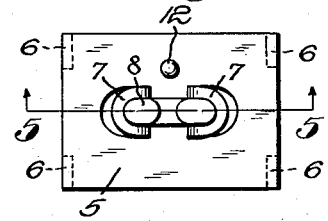
Fig. 4 is a plan view of the attaching plate per se.
Figure 5:
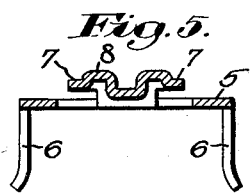
Fig. 5 is a section taken on the line 5—5 of Fig. 4.
Figure 7:
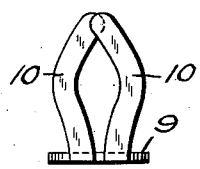
Fig. 7 is an end view of the fastener stud per se.
Figure 6:
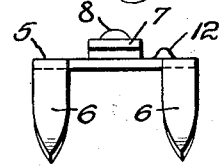
Fig. 6 is an end view of the attaching plate before attachment to the panel.

My improved fastening means for securing the upholstery part to the frame includes an attaching plate 5 rigidly secured to the inner or uncovered face of the backing 3 by a number of attaching prongs 6 in any suitable manner. The attaching plate 5 is preferably provided with projection means having an elongated head. The projection means may be formed in any suitable manner, but I have found that a desirable structure may be made by pressing out portions of the attaching plate 5 to provide a pair of hook-like members, adjacent to the center thereof, with their end portions 7—7 extending away from each other in spaced relation to the attaching plate 5, as clearly shown in Figs. 4 and 5. In order to stiffen and strengthen the ends 7—7 of the hook-like members I have provided a rib 8 which is formed in the material and connects both of the hook-like portions. The snap fastener stud member may be formed in any suitable manner and from any suitable material. The stud member illustrated is formed from sheet metal ribbon stock and bent into the desired shape. This stud has a base portion 9 and a pair of projections 10—10 extending away from the base and offset from each other for a scissors-like projection. The edges of the projections 10—10 preferably diverge and then converge relative to each other so that they may make snap fastening engagement with the frame member 1 when entered into the stud-receiving aperture 2, as illustrated in Fig. 2. The base 9 is so shaped that it is provided with an elongated aperture 11 preferably large enough in area so that it may fit over the elongated head provided by the hook-like portions when it is moved toward said hook-like portions in alignment therewith. The base 9 is also resilient so that the projections 10—10 may move toward and away from each other during entrance of the projections into the stud-receiving aperture 2.

It is now well-known that it is desirable to construct the upholstery panels and apply the attaching members thereto at some time previous to the time when the fastener studs are to be attached because the panels usually have to be shipped and handled before they are installed. This is the type of structure on which my invention is intended to improve. Therefore, it will be unnecessary to give any detailed description of the assembly of the parts with the exception of the manner in which the fastener stud is assembled with the fastener-attaching plate.

Assuming that all of the elements of the installation have been completely formed, that the frame structure is in the condition illustrated in Fig. 2 and that the panel or upholstery member is complete with the exception of the attachment of the stud, I shall now proceed to explain that operation. First, the fastener stud is approached toward the fastener stud attaching plate 5 with the base positioned so that the longest dimension of the aperture 11 is in alignment with the longest dimension of the head of the hook-like projections. Then, as the head passes through the aperture 11, the base 9 is preferably hooked under one of the outwardly bent portions 7, as clearly illustrated in Fig. 3. Thereafter the fastener stud is rotated 90 degrees to a position approximately like that illustrated in Fig. 1. In this position the projections 10—10 are in position where they can enter the stud-receiving aperture 2 directly or by a slight lateral shifting for alignment with the aperture 2. When the fastener is in the position shown in Fig. 1 it cannot become accidentally disengaged from engagement with the projections because the width of the aperture 11 will not allow sufficient shifting of the base 9 to permit the head or projections 7—7 to pass through the aperture.

Figure 3:
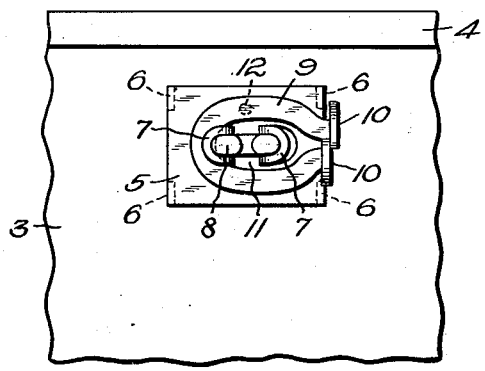
Fig. 3 is a view similar to Fig. 1 but showing the fastener stud in the position for assembly with or disassembly from the fastener-attaching member.

In order to prevent the fastener from returning accidentally to the position shown in Fig. 3 before the panel is applied, I prefer to provide some positive detent means to maintain the stud in the approximate position shown in Fig. 1, even though it might be held in that position by friction exerted upon the base by the attaching plate 5 and outwardly extending portions 7—7. A simple detent structure may be provided as illustrated by forming a projection or bump 12 (Figs. 1 and 2) in the attaching plate 5 at one side of the hook members and extending in the same direction as the hook members. Therefore, during the stud-attaching operation the base 9 will first contact the base 12 (Fig. 3) and when rotated will snap into the aperture 11 thereby preventing accidental return of the base from the position shown in Fig. 1 to the position shown in Fig. 3, while permitting the base to shift laterally to a certain extent in all directions so that the projections 10—10 may become aligned with a stud-receiving aperture 2.

The fastener-attaching plate and fastener stud of my invention are simple in construction, they are reduced to a minimum size thereby requiring the use of a minimum amount of metal, they may be used in places where heretofore larger structures could not be used and these parts are durable and relatively inexpensive to manufacture.

While I have illustrated and described a preferred embodiment of my invention, I do not wish to be limited thereby, because the scope of my invention is best defined by the following claims.

I claim:

1. An installation of the class described comprising, in combination, a frame structure presenting a stud-receiving aperture, a covering structure including a relatively stiff backing, a fastener-attaching element rigidly secured to said backing and having a projecting portion standing out from said backing and presenting an elongated head, and a snap fastener stud having a base provided with a single elongated slot through the base permitting the elongated head to pass through for attachment and detachment of the fastener and socket-engaging means extending into the stud-receiving aperture and holding the covering structure to the frame structure said base being arranged so that the slot therein is transverse to the elongated head.

2. An installation of the class described comprising, in combination, a frame structure presenting a stud-receiving aperture, a covering structure including a relatively stiff backing, a fastener-attaching element rigidly secured to said backing and having a projecting portion standing out from said backing and presenting an elongated head, a snap fastener stud having a base provided with a single elongated slot through the base permitting the elongated head to pass through for attachment and detachment of the fastener and socket-engaging means extending into the stud-receiving aperture and holding the covering structure to the frame structure, said base being arranged so that the slot therein is transverse to the elongated head, and means cooperating between the base and the fastener-attaching element to hold the fastener stud in a predetermined position relative to said fastener-attaching element.

3. An installation of the class described comprising, in combination, a frame structure presenting a stud-receiving aperture, a covering structure including a relatively stiff form, a fastener-attaching element rigidly secured to said form and having a pair of projections extending from said attaching element, said projections having their outer ends extending away from each other parallel with and spaced from the form and arranged close together to provide an elongated head and a snap fastener stud having a base provided with a single elongated slot extending crosswise to the elongated head so that the base is locked beneath said head, and said stud having yieldable socket-engaging means extending from the base into the stud receiving aperture and holding the covering structure to the frame structure.

4. A fastener installation comprising, in combination, a panel-like member, a snap fastener attaching plate rigidly secured to said panel-like member and having a pair of hook-like members extending therefrom with the hooks facing in opposite directions, and a snap fastener stud having a base resting against said attaching plate, said base having a single aperture through which said hook-like members pass and said base being held in assembled relation with said attaching plate by said hook-like members.

5. An installation of the class described including a panel-like member, a snap fastener attaching plate rigidly secured to said panel-like member and having means extending therefrom provided with an elongated head, a snap fastener stud having a base located between the attaching plate and the elongated head and having an elongated slot in the base extending transverse to the elongated head when the fastener is attached and a projection extending from said attaching plate into the elongated slot in the base to hold the fastener stud in a predetermined relation to the elongated head, and socket-engaging means extending from said base.

6. A fastener installation comprising, in combination, a panel-like member, an attaching plate rigidly secured to said panel-like member and having a pair of integral hook-like members extending therefrom adjacent to the center of the attaching plate, said hook-like members having their ends extending away from each other, and a snap fastener stud having a base portion and a socket-engaging portion, said base portion having an aperture therein to permit passage of both of the hook-like members in one predetermined position of the base relative to the hook-like members and being of such dimensions as to prevent passage of the hook-like members when the base is in another predetermined relation thereto.

7. An installation of the class described including a panel of cardboard and the like, a snap fastener attaching plate of sheet metal rigidly secured against one face of said panel, a pair of stud-holding hook-like projections formed from said attaching plate and extending therefrom, said hook-like projections having their ends cooperating to provide an elongated head spaced from the attaching plate, a snap fastener stud member having a base portion and a pair of yieldable socket-engaging projections extending therefrom and an opening in said base to permit passage of the elongated head in one predetermined position of the base relative thereto and being of such dimensions as to prevent passage of the elongated head when the base is in another predetermined relation thereto.

8. An installation of the class described including a panel of cardboard and the like, a snap fastener attaching plate of sheet metal rigidly secured against one face of said panel, a pair of stud-holding hook-like projections formed from said attaching plate and extending therefrom, said hook-like projections having their ends extending in opposite directions and cooperating to provide an elongated head spaced from the attaching plate, a snap fastener stud member formed from sheet metal and having an apertured base portion and a pair of edgewisely movable socket-engaging projections extending from the base, the aperture in said base being proportioned to permit passage of the elongated head in one predetermined position of the base relative thereto while preventing passage of the elongated head when the base is turned 90 degrees from the engaging position.

9. An installation of the class described including a panel of cardboard and the like, a snap fastener attaching plate of sheet metal rigidly secured against one face of said panel, a pair of stud-holding hook-like projections formed from said attaching plate and extending therefrom, said hook-like projections having their ends cooperating to provide an elongated head spaced from the attaching plate, a snap fastener stud member formed from sheet metal and having an apertured base portion and a pair of edgewisely movable socket-engaging projections extending from the base, the aperture in said base being proportioned to permit passage of the elongated head in one predetermined position of the base relative thereto while preventing passage of the elongated head when the base is turned 90 degrees from the engaging position, and a projection extending from one of the parts of the fastener assembly into engagement with the other part to prevent rotation of the base to a position where the elongated head may pass through the aperture while permitting limited lateral shifting of the base relative to the attaching plate in any direction.

WALTER I. JONES.